Oct. 5, 1965 A. E. HALL 3,210,117
SPARE TIRE MOUNT FOR A TOWING VEHICLE
Filed Oct. 14, 1963 4 Sheets-Sheet 1

INVENTOR.
ALBERT E. HALL
BY
Lothrop & West
ATTORNEYS

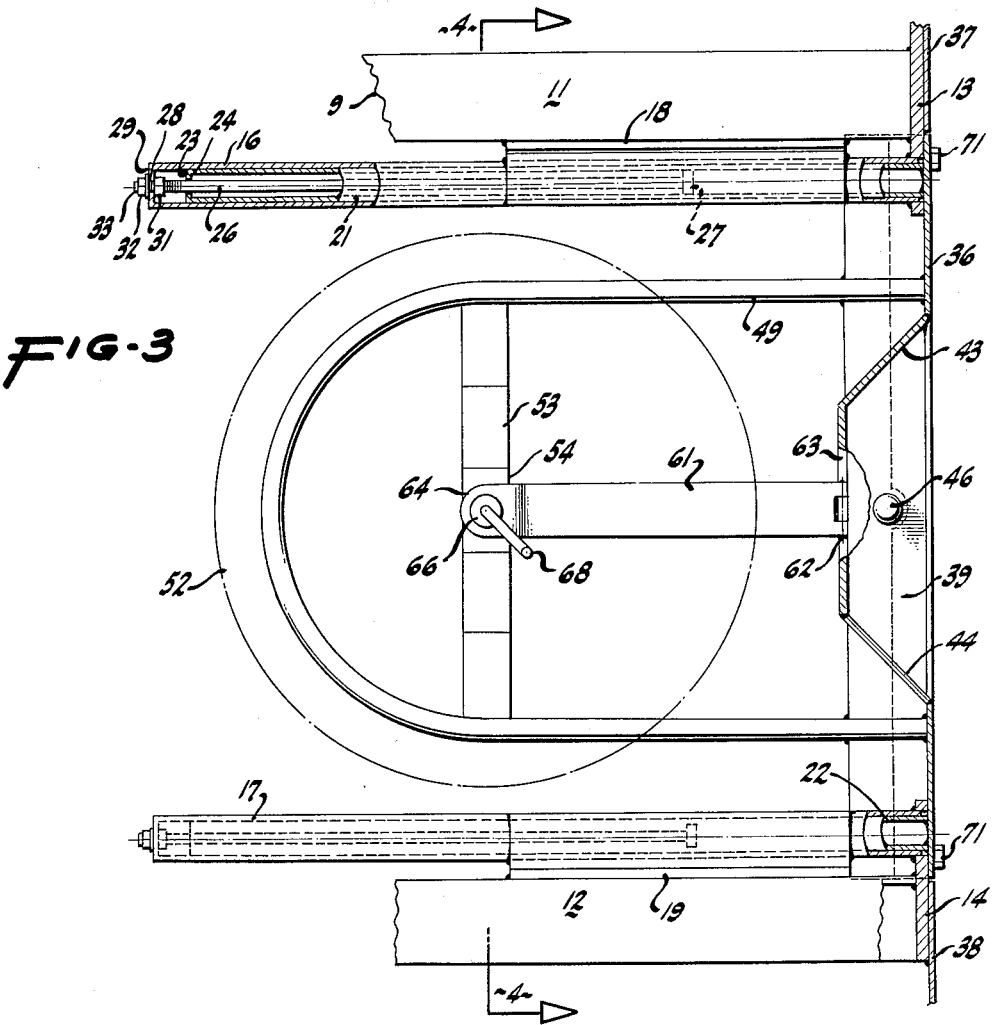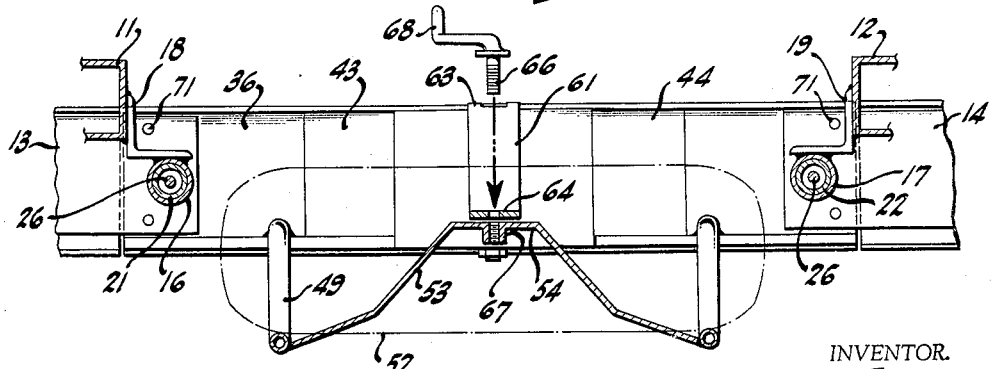

Oct. 5, 1965 A. E. HALL 3,210,117
SPARE TIRE MOUNT FOR A TOWING VEHICLE
Filed Oct. 14, 1963 4 Sheets-Sheet 3

INVENTOR.
ALBERT E. HALL
BY
Lothrop & West
ATTORNEYS

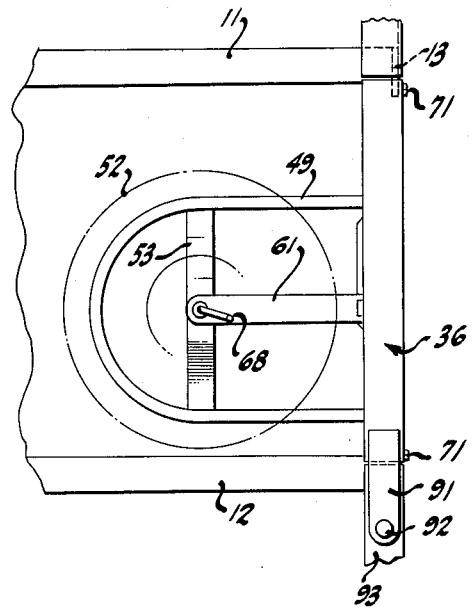
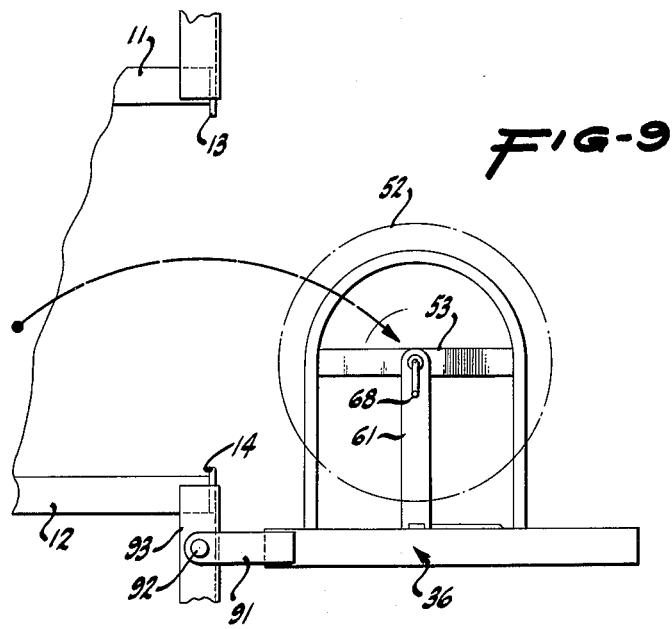

3,210,117
SPARE TIRE MOUNT FOR A TOWING VEHICLE
Albert E. Hall, 8885 Halvorson Drive, Elk Grove, Calif.
Filed Oct. 14, 1963, Ser. No. 315,765
4 Claims. (Cl. 296—37.2)

My invention relates to means for securely mounting a mounting a spare tire on the vehicle for ready access in emergeny despite the fact that the vehicle has a rear connection for towing service.

It is an object of the invention to provide a spare tire mount which adds to the utility or strength of the vehicle as a towing device, and vice versa.

Another object of the invention is to provide a spare tire mount in which the spare tire is stowed out of the way but nevertheless is readily accessible for use.

A still further object of the invention is to provide a spare tire mount which can support a spare tire firmly and against rattling and displacement, yet which will present the spare tire for use in a facile fashion.

Another object of the invention is to provide a spare tire mount for a towing vehicle in which the towing connections and the spare tire arrangements are interrelated for mutual use and support.

Other objects together with the foregoing are attained in the forms of the invention described in the accompanying description and illustrated in the accompanying drawings, in which:

FIGURE 3 is a plan of the mechanism shown in the preceding figure, the view being taken in a plane indicated by the line 3—3 of FIGURE 1;

FIGURE 4 is a cross section, the plane of which is indicated by the line 4—4 of FIGURE 3;

FIGURE 8 is a plan comparable to FIGURE 3 but showing a further modified form of the invention; and FIGURE 9 is a view comparable to FIGURE 8 but showing the structure in projected position.

Figure 1:
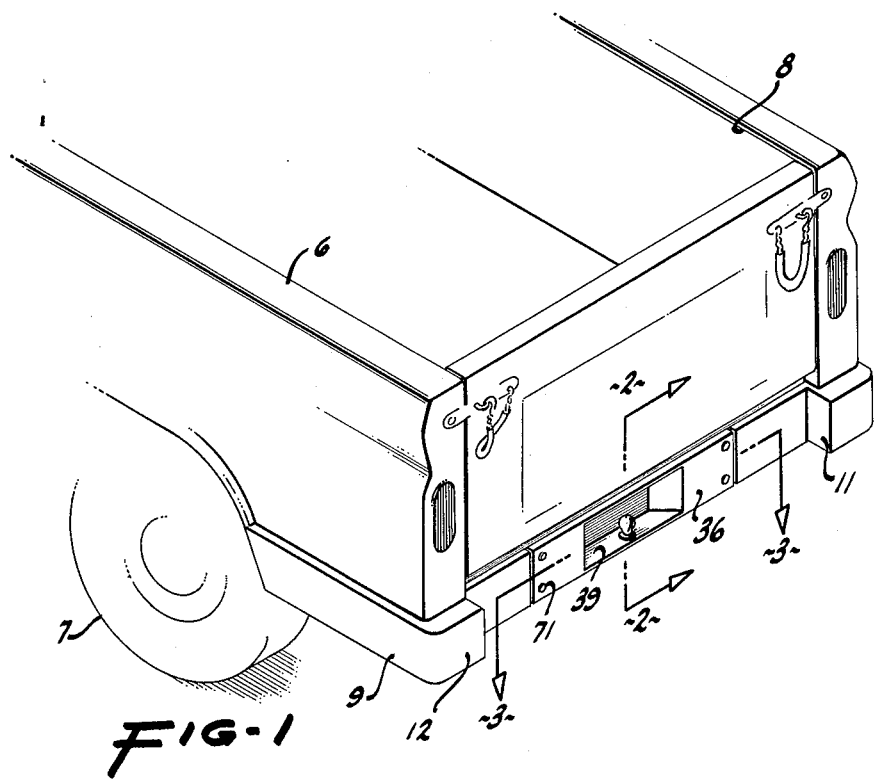
FIGURE 1 is an isometric perspective view from the rear quarter showing a towing vehicle equipped with a spare tire mounte pursuant to my invention.

While the spare tire mount for a towing vehicle pursuant to the invention can be embodied in the various ways disclosed herein, in one typical installation the spare tire mount is incorporated in a towing vehicle 6 represented as a pickup truck having rear driving wheels 7, a box body 8 and a main frame 9 including substantially parallel side rails 11 and 12 (FIGURE 3) of the customary sort. These rails extend longitudinally of the vehicle in a horizontal plane and form the major support of the device.

Pursuant to this form of the invention, the frame side rails are provided with a pair of anchor plates 13 and 14 which are relatively stiff members arranged vertically in the same transverse plane. They extend toward each other from the side rails but stop short to leave an intervening central gap a little larger than the maximum external diameter of a tire for the vehicle 6.

Also mounted on the side rails 11 and 12 are primary support tubes 16 and 17. The construction on both sides of the vehicle is symmetrical so that the description applies equally to both. The primary tubes 16 and 17 are fastened in position through the medium of angles 18 and 19 conveniently welded to the frame 9 and to the primary tubes to afford a rigid mounting. The primary tubes 16 and 17 extend longitudinally in the same plane and parallel to the side rails 11 and 12 and terminate rearwardly after passing through and being anchored to the plates 13 and 14.

Disposed within the primary tubes 16 and 17 are secondary tubes 21 and 22 slightly shorter in length but freely slidable within the primary tubes and engaging them closely enough so as to move lengthwise substantially on the same axis. The secondary tubes each are provided at their forward ends with closure washers 23 welded in position. A central aperture 24 in the washer receives a stop rod 26. At its rearward end each of the stop rods is provided with a head 27 lying in the path of the washer 23. At the forward end each of the stop rods is adjustably mounted through an aperture 28 in an end closure 29 of the associated primary tube 16 by means of adjusting and lock nuts 31 and 32 engaging a threaded terminus 33 of the stop rod. The stop head 27 can thus be positioned within reasonable limits to limit the extent of withdrawal of the secondary tube 21 from the primary tube 16 since the washer 23 engages the head 27.

Spanning the gap between the anchor plates 13 and 14 and overlying a portion of both anchor plates is a towing or center plate 36 of relatively thin material of channel form. This plate 36 is welded to both of the seconndary tubes 21 and 22 so that they move in unison. Usually the plate 36 is continued by trim plates 37 and 38 overlying the anchor plates 13 and 14 and in one position of the apparatus is disposed coplanar therewith for neat appearance. Since the towing or center plate 36 is relatively light in construction, it is substantially reinforced by a box construction, and is arranged to provide for insetting a towing instrumentality. The plate 36 is provided with a central opening 39 leading to the interior of a box in part defined by a heavy bottom plate 40 (FIGURE 2) extending for substantially the full width of the frame 9, a top plate 41 and a rear plate 42. The top plate and rear plate can be integrally formed of an angle iron, if desired.

Also helping to define the box construction are angular plates 43 and 44. These parts are welded together so that the angular position of the plates 43 and 44 and the interconnection of the top, bottom and rear plates provides a box section. This is connected to the center or towing plate 36 and results in a construction that is relatively light but is very strong in torsion about a transverse horizontal axis and also is very strong as a beam when considered transversely of the vehicle either horizontally or vertically. Mounted in the center of the opening 39 and passing through the lower plate 40 is a towing hitch ball 46 of the customary kind having a securing nut 47 thereon.

To provide further reinforcement for the towing function and especially to take advantage of the beam strength and torsional stiffness of the box section, I provide a spare tire mounting frame 49 made up primarily of a tube bent into a U-shape in plan. The tube also has a downwardly directed offset portion to afford a horizontal platform 51 of sufficient extent to underlie and support a tire 52 for the vehicle 6. The tubular support 46 is welded at its rearward ends not only to the towing plate 36, but also to the bottom plate 40 and thus is firmly provided with a firm base mounting from which the frame 49 cantilevers forwardly between the side rails 11 and 12 of the main frame 9 and also between the primary tubes 16 and 17.

The tire mounting frame is inclusive of a transversely extending, upwardly directed cross bridge 53 secured at its ends to the tube 49 and providing a central raised portion 54 in a position to receive the central part 56 of a wheel 57 carrying the tire 52.

Figure 2:
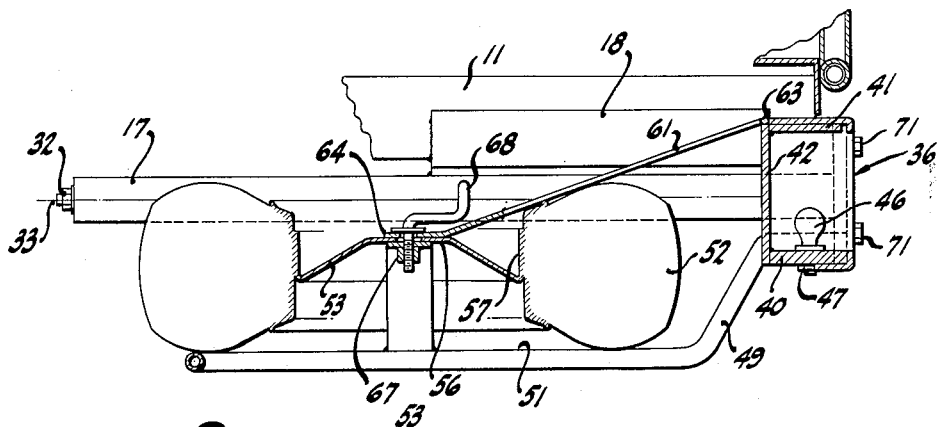
FIGURE 2 is a cross section, the plane of which is indicated by the line 2—2 of FIGURE 1, certain portions of the figure being broken away to reduce its size.
Figure 5:
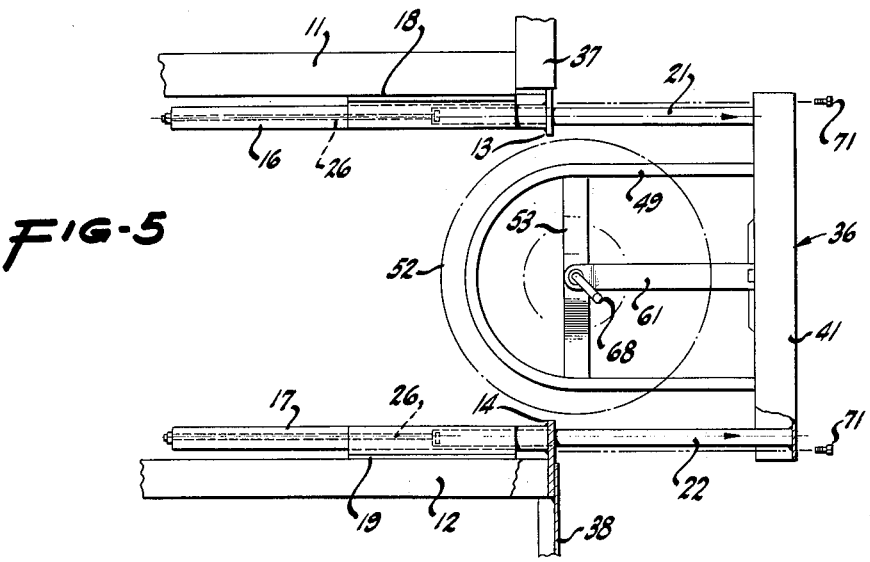
FIGURE 5 is a plan comparable to FIGURE 3 but showing the device of the invention in projected position.
Figure 6:
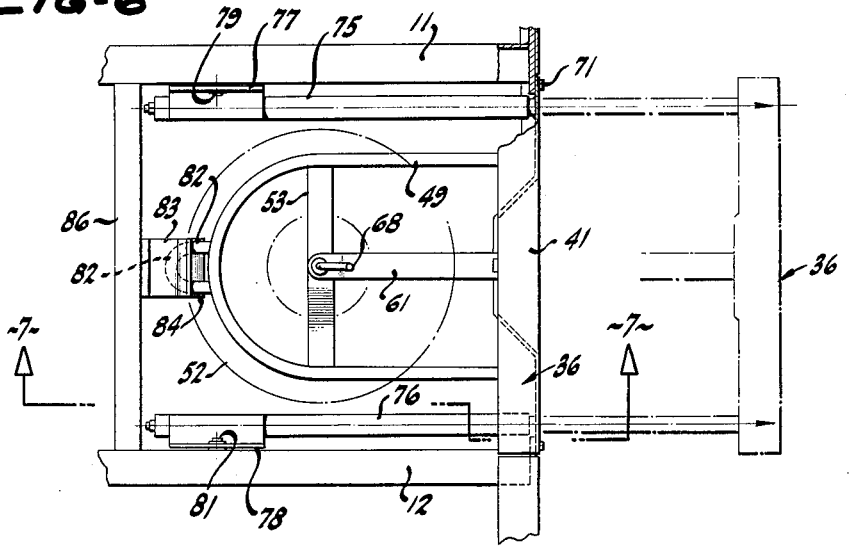
FIGURE 6 is a view comparable to FIGURE 3 but showing a modified form of device pursuant to the invention.

While the wheel and tire can be directly fastened solely to the bridge 53 if desired, I preferably take advantage of the arrangement to provide further support, especially since the frame 49 is cantilevered quite far from the towing plate 36. For that reason, there is provided a strap brace 61 at one end connected by a pivot pin 62 to a hinge 63 near the edge of the top plate 41, so that the brace 61 can be swung from an upper, rearwardly extending position into a lower, forwardly extending position substantially as shown in FIGURE 2. A pad 64 at the forward end of the brace overlies the wheel 57 immediately over the raised bridge center portion 54. A suitable securing bolt 66 passes through openings in the brace 61 and in the wheel center 56. A permanently secured nut 67 is engaged by the bolt 66 and for convenience a crank handle 68 extends from the bolt for easy operation.

With this structure as so far described, the spare tire 52 is normally neatly stowed in an advantageous and protected position between and beneath the side rails 11 and 12. By grasping the hitch ball 46, the user can move the spare tire out into an accessible position by withdrawing the secondary tubes 21 simultaneously from the primary tubes until the stops are engaged. In that position of the parts, the spare tire is firmly supported in a horizontal plane well behind the rear terminus of the body 8. By unwinding the crank 68, the user can free the bolt 66 and can then swing the brace 61 out of the way. The tire and wheel can then be removed and replaced by another, if desired. The brace 61 can then be put into position and the bolt 66 tightened to assist in supporting the cantilevered portion of the spare tire mount from the rear towing plate. Because of the box construction and reinforcement of this plate, it can withstand readily the torsional load imposed by the cantilevered wheel support 49 and the brace 61, if the latter is employed.

In order to keep the spare tire in its stowed, normal position and also to hold the towing plate 36 in position for the customary towing operation, I provide a plurality of bolts 71 on both sides of the center of the vehicle, the bolt shanks passing through appropriate openings in the towing plate 36 and engaging in the subjacent anchor plates 13 and 14. Thus, when a towed vehicle has its hitch engaged with the towing ball 46, the towing strains both for propulsion and braking are transmitted to the ball and are taken by the box section of the towing plate 36 and are thus adequately transmitted to the anchor plates 13 and 14 and from them to the frame 9. Consequently, the vehicle 6 can be utilized as a towing vehicle in the customary fashion, yet if necessary the spare tire can readily be retrieved from its protected position and exposed for ready use.

Figure 7:
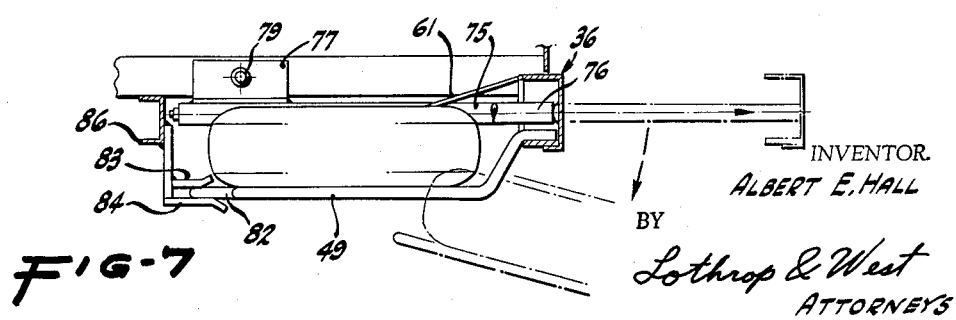
FIGURE 7 is a cross section, the planes of which are indicated by the lines 7—7 of FIGURE 6.

Under some circumstances, I prefer to arrange the mechanism in such a way as to provide for making the spare tire even more readily accessible. In this instance, instead of supporting the primary tubes 16 and 17 rigidly on the frame side rails 11 and 12 by means of the angles 18 and 19, I connect the primary tubes 75 and 76 to the side rails 11 and 12 by mounting brackets 77 and 78. These are of angular shape and are welded directly to the primary tubes 75 and 76, but instead of being welded to the frame side rails are connected thereto by pivot pins 79 and 81 arranged in horizontal alignment transversely of the vehicle. The remaining structure is as before. With this mechanism, the withdrawal of the spare tire from its stowed position can be in a purely horizontal path if desired or, in addition, the entire support and mounting structure, including the towing mechanism, can be dropped at an angle, as especially shown in FIGURE 7, so that the tire, particularly a heavy tire, can be more readily maneuvered.

Since this arrangement is especially designed for heavy tires, the support of the structure includes not only the customary box section, but furthermore the tubular frame 49 is centrally provided with a forwardly extending U-shaped extension 82 arranged to be guided between and firmly supported by a pair of plates 83 and 84 depending from a cross member 86 of the frame 9 secured to the side rails 11 and 12. The plates 83 and 84 are flared apart in their rearward portions. In the final restoring movement of the spare tire mount in substantially a horizontal direction, the forward extension 82 is piloted between the plates 83 and 84 and is firmly supported by them. Thus, the duty of the box section is somewhat lessened and the cantilever frame 49 acts as a beam support when in stowed position. The construction of this pivoting form of device is otherwise identical with that previously described.

Some variations occur in another form of device in which the remaining features are substantially the same. As shown in FIGURES 8 and 9, the frame side rails 11 and 12 are still provided with the anchor plates 13 and 14 and the center towing plate 36 is substantially the same as before, although mounted differently. In this case, the primary and secondary tubes are dispensed with. Instead, the flanges of the channel and box section towing plate 36 at one end are provided with upper and lower hinge plates 91 engaging a pivot pin 92 passing through a frame member 93 secured to the side rail 12. The towing plate 36 is designed to swing from a stowed position as shown in FIGURE 8 into an accessible position as shown in FIGURE 9 with the spare tire 52 passing through the gap between the anchor plates 13 and 14.

In this case the spare tire is carried somewhat off center of the vehicle when in its stowed location, so that the spare tire can clear the margins of the gap readily when moved to its useful position. The arrangement is such that the towing plate is releasably held in its towing position by bolts 71 as before, these being sufficient to take the various towing strains and also to hold the towing plate against torsional dislodgment by the spare tire mount. The action of the bolts 71 is supplemented by the hinge or pivot pin 92. Preferably, the hinge pin 92 is slightly loose in its interconnection so that the final securing effect is provided by the bolts 71. When these are tightened, the entire rear end of the vehicle framing is united substantially as one member and the stiffening effects of the central towing plate both in torsion and as a beam are employed.

What is claimed is:

1. A spare tire mount for a towing vehicle having a frame including a pair of spaced longitudinal side rails, said mount comprising:

(a) a pair of anchor plates mounted on the after end of said side rails, said anchor plates extending transversely toward each other and leaving a substantially central gap;

(b) a pair of supporting primary tubes mounted longitudinally on said side rails and secured to said anchor plates;

(c) a pair of secondary tubes slidably disposed within said primary tubes, said secondary tubes being capable of extending rearwardly beyond said anchor plates;

(d) a transverse towing plate mounted on the after ends of said secondary tubes and having a transverse length sufficient to span said central gap between said anchor plates;

(e) means fastened to said towing plate for supporting a spare tire, said tire supporting means including a cantilevered frame mounted on said towing plate and projecting forwardly therefrom to afford a tire supporting platform, and a brace pivotally mounted on its after end to said towing plate and releasable secured adjacent its forward end to said cantilevered frame, said brace overlying the subjacent portion of a spare tire on said frame to confine said spare tire and hold said frame in load supporting relationship, said spare tire supporting means being longitudinally movable with said towing plate and said secondary tubes as said towing plate moves between a first position between said anchor plates and a second position to the rear of said anchor plates; and, (f) means for securing said towing plate to said anchor plates in said first position.

2. The device of claim 1 further characterized by a transverse bottom plate mounted on the bottom of said towing plate and extending forwardly therefrom, a vertical plate mounted on the forward central portion of said bottom plate, a pair of angle plates connecting said vertical plate and said towing plate adjacent the lateral margins of a central opening in said towing plate, said plates forming a load resisting hollow box, and a towing hitch ball mounted on said bottom plate and being located entirely within said box.

3. The device of claim 2 wherein said primary tubes are pivotally mounted on said side rails for rotation about a transverse horizontal axis.

4. The device of claim 3 further characterized by means supported between said side rails for supporting the forward end of said tire frame in forwardmost location thereof.

References Cited by the Examiner

UNITED STATES PATENTS

| | | | |
|---|---|---|---|
| 2,010,270 | 8/35 | Lawrence | 296—37.2 |
| 2,034,834 | 3/36 | Robinson | 296—37.2 X |
| 2,131,746 | 10/38 | Morrison | 296—37.2 |
| 2,707,650 | 5/55 | Lawton | 280—500 X |

FOREIGN PATENTS 991,371  6/51  France.

A. HARRY LEVY, *Primary Examiner.*

LEO FRIAGLIA, *Examiner.*